C. J. & H. W. WILLIAMS.
MACHINES FOR SETTING PLANTS.
No. 186,698.          Patented Jan. 30, 1877.
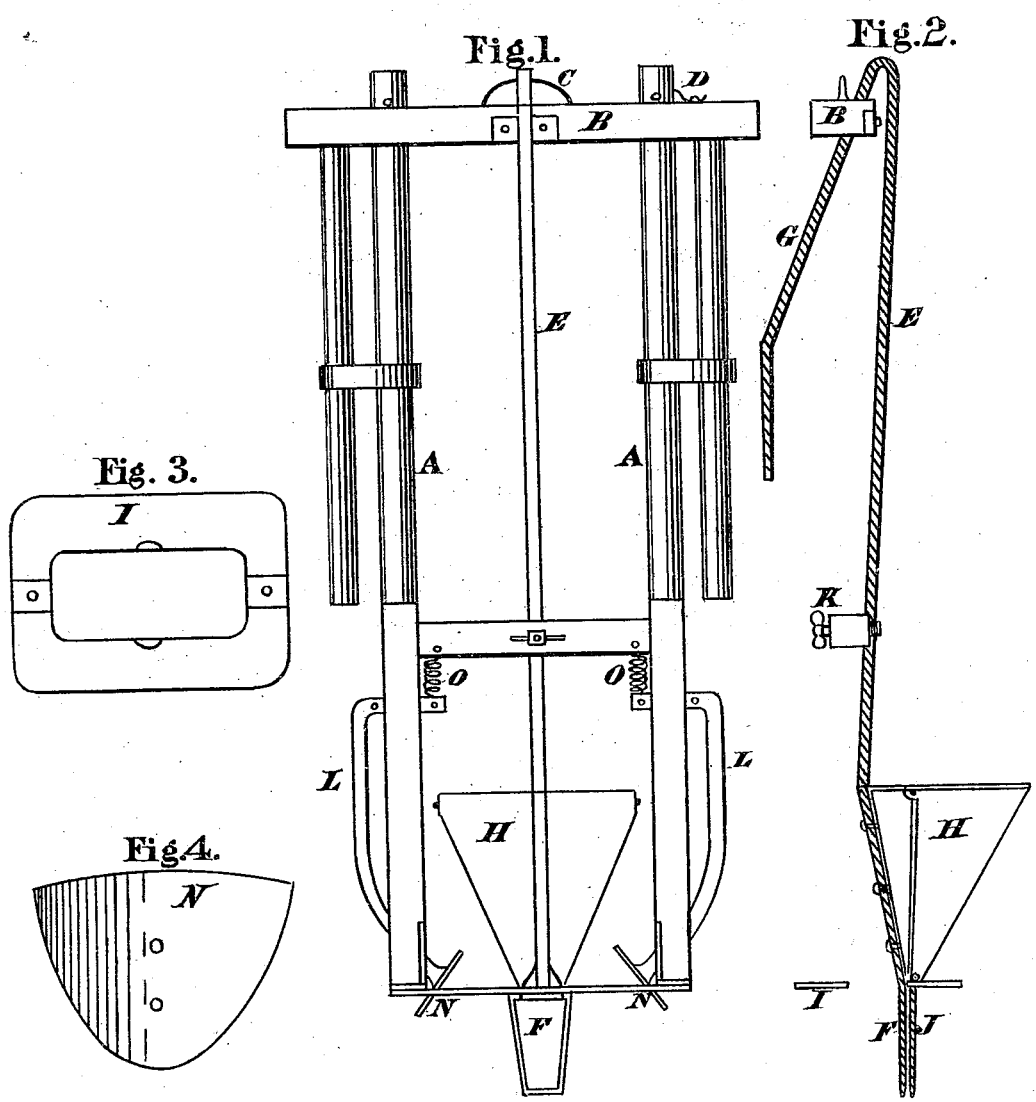
WITNESSES.
INVENTOR.

UNITED STATES PATENT OFFICE.

CALVIN J. WILLIAMS AND HENRY W. WILLIAMS, OF CAVERNA, KENTUCKY.

IMPROVEMENT IN MACHINES FOR SETTING PLANTS.

Specification forming part of Letters Patent No. 186,698, dated January 30, 1877; application filed August 8, 1876.

*To all whom it may concern:*

Be it known that we, CALVIN J. and HENRY W. WILLIAMS, of Caverna, in the county of Hart, and State of Kentucky, have invented a certain new and useful Improvement in a Machine for Setting Plants; and we do hereby declare that the following is a full, clear, and exact description thereof, which will enable others skilled in the art to make and use the same, reference being had to the accompanying drawings, forming part of this specification.

Figure 1 is a sectional view, showing the general construction of the machine. Fig. 2 is a side view, showing the operating-bar, and hopper, for holding the plants. Fig. 3 is a view of the plate on the lower end of the machine. Fig. 4 is a view of the blade for closing the soil around the plants when set.

This invention relates to a novel device for setting plants, the object of which is to provide a cheap and simple device for setting tobacco, cabbage, and other similar plants, that will be easily operated, and by means of which a greater number of plants can be set in a given time with less labor to the operator than is possible to be done by the ordinary processes now in use for such purpose.

This machine is more fully illustrated in detail in sectional views, Figs. 1, 2, 3, and 4 of the drawing, in which A A is the main frame, and B the operating-slide, all of which are made of wood, and in form as shown in the drawings. C is a handle for operating the machine. D is a trigger for holding the slide in position when required. E is a lever that gives motion to the spade end below, used for opening a hole for the plants. This lever is made of iron in form as shown in the drawing, with a spade-shaped end at the bottom, as shown at F, and is operated by means of the slide B when pressed down over the angle part of the bar at G, which causes the jaw F to open, and thereby form a hole for the plants. H H is the hopper in which the plants are placed ready for setting, which hopper is made of sheet metal hinged together at the top corners, with one part riveted to the lever E, while the other is hinged to the plate I. J is a spade-shaped point, secured to the under side of the plate I, and is made to correspond in size and shape with the point F. K is a thumb-screw for adjusting the lever E. L L are curved levers for operating the blades N N for closing the soil around the plants. These levers are made of iron in form as shown in the drawing, with blades secured to the lower ends for closing the soil around the plants, and are operated by the frame B, when pressed down upon the shoulders of the levers L L, which work on the lower part of the mortise in the frame, and thereby gives the required motion to close the blades N N on the plant, after which they are again replaced by means of springs O O at the top of the levers.

Having thus fully described the nature and object of this our invention, what we claim as new, and desire to secure by Letters Patent, is—

The combination, in a machine for setting plants, of the frame A A with its slide B, operating-lever E with its point F, hopper H H, and plate I with its point J, and adjusting-screw K, also the levers L L with their blades N N, and springs O O, arranged, constructed, and operated substantially as and for the purpose hereinbefore set forth.

CALVIN J. WILLIAMS.
HENRY W. WILLIAMS.

Witnesses:
E. G. WILCOXSON,
C. M. REDFORD.